(12) United States Patent
Hashimoto et al.

(10) Patent No.: US 7,593,421 B2
(45) Date of Patent: Sep. 22, 2009

(54) COMMUNICATION CONTROL DEVICE HAVING MULTIPROCESSOR

(75) Inventors: Naoya Hashimoto, Tokyo (JP); Kamio Yoshida, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 824 days.

(21) Appl. No.: 10/630,832

(22) Filed: Jul. 31, 2003

(65) Prior Publication Data

US 2004/0052261 A1 Mar. 18, 2004

(30) Foreign Application Priority Data

Sep. 17, 2002 (JP) ............... 2002-270520

(51) Int. Cl.
*G06F 13/14* (2006.01)
(52) U.S. Cl. ............... 370/439; 370/452; 710/305
(58) Field of Classification Search ............... 370/412, 370/258, 449, 450, 452; 710/28, 100, 104, 710/305
See application file for complete search history.

(56) References Cited

U.S. PATENT DOCUMENTS

| | | | | |
|---|---|---|---|---|
| 4,817,082 A | * | 3/1989 | Orsic | ............... 370/389 |
| 5,896,501 A | * | 4/1999 | Ikeda et al. | ............... 709/216 |
| 6,751,213 B1 | * | 6/2004 | Sun et al. | ............... 370/352 |
| 7,254,111 B2 | * | 8/2007 | Choe et al. | ............... 370/219 |
| 2001/0003525 A1 | * | 6/2001 | Ebina et al. | ............... 370/403 |
| 2003/0120876 A1 | * | 6/2003 | Hass et al. | ............... 711/146 |

OTHER PUBLICATIONS

Intel Edge Aggregation Router Solution.

* cited by examiner

*Primary Examiner*—Seema S Rao
*Assistant Examiner*—Mon Cheri S Davenport
(74) *Attorney, Agent, or Firm*—Venable LLP; James R. Burdett; Kyle D. Petaja

(57) ABSTRACT

A communication control device comprising a plurality of network processors for performing high-speed communication among these network processors. The communication device connects a plurality of processor interfaces to each other using an internal communication path. Each processor interface is connected to one or a plurality of the network processors. The processor interface comprises a selector for each connected network processor. In one preferred embodiment of this invention, transmission rights are granted to a selector which received a token cell. The selector outputs communication cells received from a network processor onto the internal communication path only when the selector possesses the transmission rights. Having outputted all of the communication cells, the selector outputs the token cell onto the internal communication path. When the token cell is outputted, the selector loses the transmission rights.

20 Claims, 6 Drawing Sheets

COMMUNICATION CONTROL DEVICE HAVING MULTIPROCESSOR

BACKGROUND OF THE INVENTION

1. Field of the Invention

The present invention relates to a communication control device for performing parallel processing using a plurality of processors. The present invention is applied to a router, load balancer, and so on for a communication network.

2. Description of Related Art

Routers and load balancers execute relay processing of communication data (packets and the like) inputted from an external communication path.

A router is a device for performing relay processing at the network layer of the Open Systems Interconnection (OSI) Reference Model. A plurality of communication paths is connected to the router. The router receives IP (Internet Protocol) packets from each communication path. The router then determines the communication path to which the IP packet is to be outputted in accordance with a destination IP address noted in a header part of the IP packet. A routing table stored in the router in advance is referenced to determine the communication path.

A load balancer is a device for performing relay processing at the transport layer or above of the OSI Reference Model. The load balancer connects a communication network to a plurality of Web servers. More specifically, this type of load balancer distributes HTTP requests received from a client among the plurality of Web servers. A URL conversion table or the like which is stored in the load balancer in advance is referenced to perform this distribution. By using a load balancer, an HTTP request pertaining to a single URL can be divided among the plurality of Web servers. In so doing, increases in the load on each individual Web server are suppressed, and thus the response performance of the Web servers is improved.

Many routers and load balancers comprise a plurality of processors. By means of parallel processing using a plurality of processors, IP packets can be controlled at high speed and with a high degree of reliability.

In a control device for causing a plurality of processors to operate in parallel, it is desirable that inter-processor communication be performed at sufficiently high speed. This is due to the fact that when communication speed is low, processing time increases.

SUMMARY OF THE INVENTION

An object of the present invention is to provide a communication control device with a high inter-processor communication speed and at a low cost.

In order to achieve this object, a communication control device according to the present invention comprises: an internal communication path connecting a plurality of processor interfaces to each other; a plurality of processors, one or a plurality of which is connected to each of the processor interfaces; a cell distributor provided within the processor interface and connected to each of the processors for transferring a communication cell received from the internal communication path to a connected processor when the destination of the communication cell is the connected processor; and a selector provided within the processor interface and connected to each of the processors for outputting a communication cell received from a connected processor onto the internal communication path only when said selector possesses transmission rights.

The communication control device of the present invention comprises an internal communication path, and therefore high-speed communication can be performed. Moreover, only a selector which holds transmission rights outputs communication cells onto the internal communication path, and thus the reliability of data stored in the communication cells is not damaged.

BRIEF DESCRIPTION OF THE DRAWINGS

Other objects and advantages of the present invention will be described below with reference to the attached drawings.

DESCRIPTION OF THE PREFERRED EMBODIMENTS

Embodiments of the present invention will now be described using the drawings. In the drawings, the magnitude, form, and positional relationships of each constitutional component are merely illustrated schematically in order to facilitate understanding of the present invention. Further, the numerical conditions described below are simply examples thereof.

First Embodiment

Figure 1:
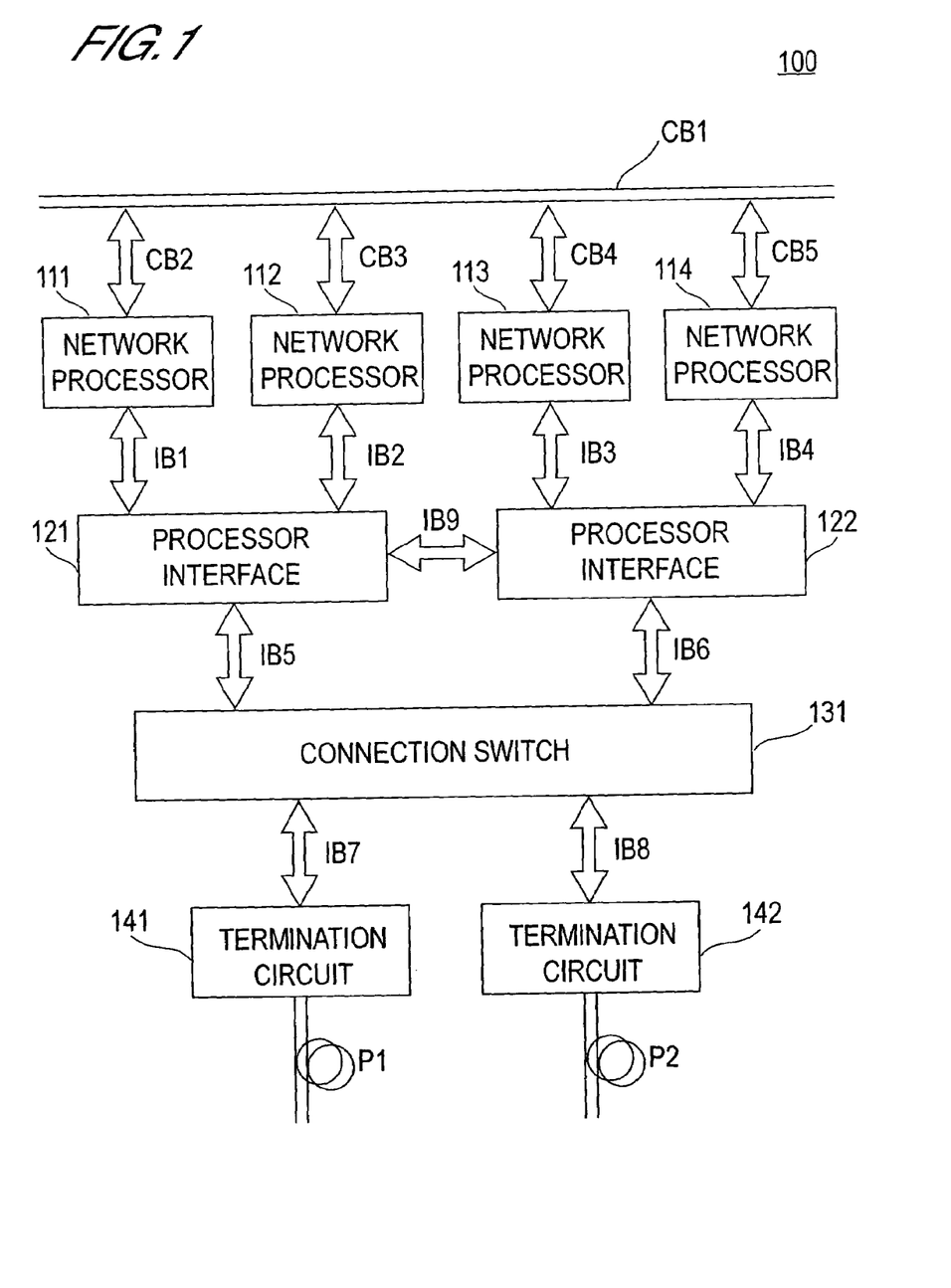
FIG. 1 is a block diagram showing the overall constitution of a communication control device according to a first embodiment.

FIG. 1 is a block diagram showing the overall constitution of a communication control device according to this embodiment.

As shown in FIG. 1, a communication control device 100 according to this embodiment comprises network processors 111, 112, 113, 114, processor interfaces 121, 122, a connection switch 131, termination circuits 141, 142, control buses CB1 to CB5, and internal buses IB1 to IB9.

The network processors 111 to 114 perform predetermined parallel processing. The internal constitution of the network processors 111 to 114 may be identical or not identical. In this embodiment, an example will be described in which all of the network processors 111 to 114 have the same internal constitution. The internal constitution of the network processors 111 to 114 will be described below using FIG. 2. As shown in FIG. 1, the network processors 111 to 114 are connected to each other via the control buses CB1 to CB5.

The processor interfaces 121, 122 serve as interfaces for enabling communication among the network processors 111 to 114 and between the network processors 111 to 114 and the connection switch 131. As shown in FIG. 1, the processor interface 121 is connected to the internal buses IB1, IB2, IB5, IB9, and the processor interface 122 is connected to the internal buses IB3, IB4, IB6, IB9. The internal constitution of the processor interfaces 121, 122 may be identical or not identical. In this embodiment, an example will be described in which the processor interfaces 121, 122 have the same constitution. The internal constitution of the processor interfaces 121, 122 will be described below using FIG. 3.

The connection switch 131 connects the processor interfaces 121, 122 to the termination circuits 141, 142. More specifically, the connection switch 131 connects the internal bus IB5 to either of the internal buses IB7, IB8 and connects the internal bus IB6 to either of the internal buses IB7, IB8. Connections made by the connection switch 131 can be switched at any time.

The termination circuits 141, 142 receive IP packets from communication paths P1, P2 and transmit the IP packets to the internal buses IB7, IB8. The termination circuits 141, 142 also receive IP packets from the internal buses IB7, IB8 and transmit the IP packets to the communication paths P1, P2. Discrepancies at the data-link layer or below in the IP packets received from the communication paths P1, P2 are absorbed by the termination circuits 141, 142.

The control buses CB1 to CB5 are mainly used in the initialization of the communication control device 100. Hence it is sufficient to use narrowband buses, or in other words buses with a low communication speed, as the control buses CB1 to CB5. For example, PCI (Protocol Control Information) buses may be used as the control buses CB1 to CB5.

The internal buses IB1 to IB9 are used in the communication of data to be processed, the communication of control information (an HTTP request or the like) for parallel processing, and so on. Hence the traffic on the internal buses IB1 to IB9 is extremely heavy. Therefore, broadband buses are used as the internal buses IB1 to IB9.

Figure 2:
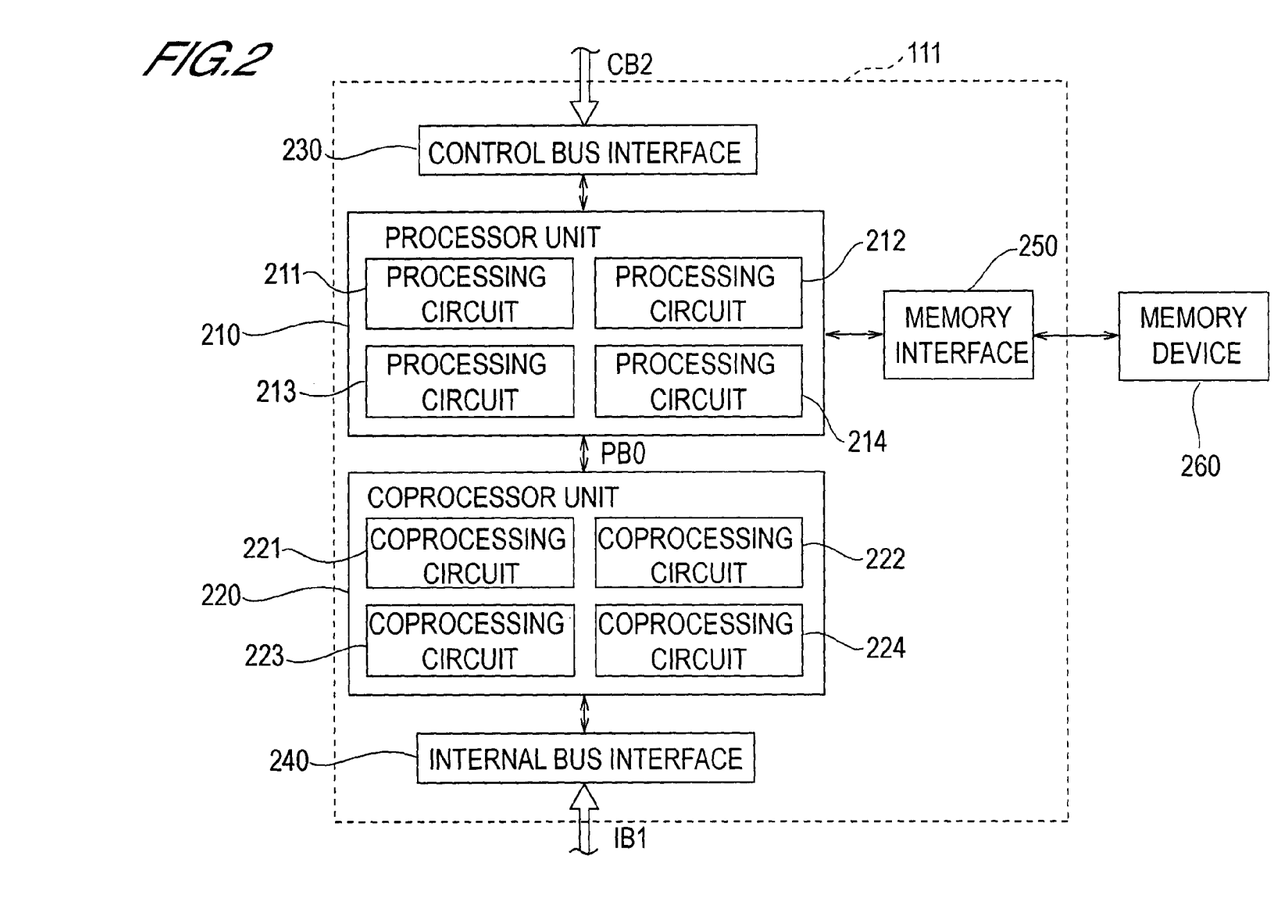
FIG. 2 is a block diagram illustrating the internal constitution of a network processor according to the first embodiment.

FIG. 2 is a block diagram showing the internal constitution of the network processor 111. As noted above, the internal constitution of the network processors 112 to 114 is identical to the internal constitution of the network processor 111.

As shown in FIG. 2, the network processor 111 comprises a processor unit 210, a coprocessor unit 220, a control bus interface 230, an internal bus interface 240, and a memory interface 250.

The processor unit 210 comprises one or a plurality of processing circuits. In the example in FIG. 2, the processor unit 210 comprises four processing circuits 211 to 214. The processor unit 210 is connected to the coprocessor unit 220 via a bus PB0 within the network processor 111. The processor unit 210 and coprocessor unit 220 communicate using the bus PB0. The processor unit 210 cannot communicate directly with the high-speed bus IB1. The processing circuits 211 to 214 communicate with the bus IB1 via the coprocessor unit 220. It is generally difficult to broaden the band of the bus PB0 within the network processor 111. Hence the processor unit 210 mainly performs processing in which high-speed communication is unlikely to be needed. In this embodiment, the processor unit 210 executes a processing program stored within the processor unit 210. When the processor unit 210 executes the program, a signal which is communicated between the units 210, 220 via the bus PB0 is a control signal, and therefore high-speed communication is not required. This processing is executed in parallel by the four processing circuits 211 to 214. The processing circuits 211 to 214 are capable of communicating with each other.

The coprocessor unit 220 comprises one or a plurality of coprocessing circuits. In the example in FIG. 2, the coprocessor unit 220 comprises four coprocessing circuits 221 to 224. The coprocessor unit 220 is capable of direct communication with the high-speed bus IB1 via the internal bus interface 240. Hence the coprocessor unit 220 mainly performs processing in which high-speed communication is likely to be needed. In this embodiment, the coprocessor unit 220 mainly performs communication data processing. Communication data processing is executed on the basis of the program processing executed by the processor unit 210. Communication data processing is executed in parallel by the four coprocessing circuits 221 to 224. The coprocessing circuits 221 to 224 are capable of communicating with each other.

The control bus interface 230 is an interface for making a communication connection between the processor unit 210 and the control bus CB2.

The internal bus interface 240 is an interface for making a communication connection between the coprocessor unit 220 and the internal bus IB1.

The memory interface 250 is an interface for making a communication connection between the processor unit 210 and a memory device 260. The memory device 260 is shared memory connected to all of the network processors 111 to 114. The processor unit 210 uses the memory device 260 when the internal memory capacity is insufficient and so on. The memory device 260 may also be used during control signal communication among the network processors 111 to 114. The processor unit in one of the network processors writes control information to the memory device 260, the processor unit in another network processor reads the control information from the memory device 260, and thus control information communication is performed. The system of performing control information communication via the shared memory 260 is known as a tightly-coupled system. Conversely, a system of performing control information communication via a bus, interface, or the like is known as a loosely-coupled system. The communication control device 100 according to this embodiment is capable of implementing both a tightly-coupled system and a loosely-coupled system.

Figure 3:
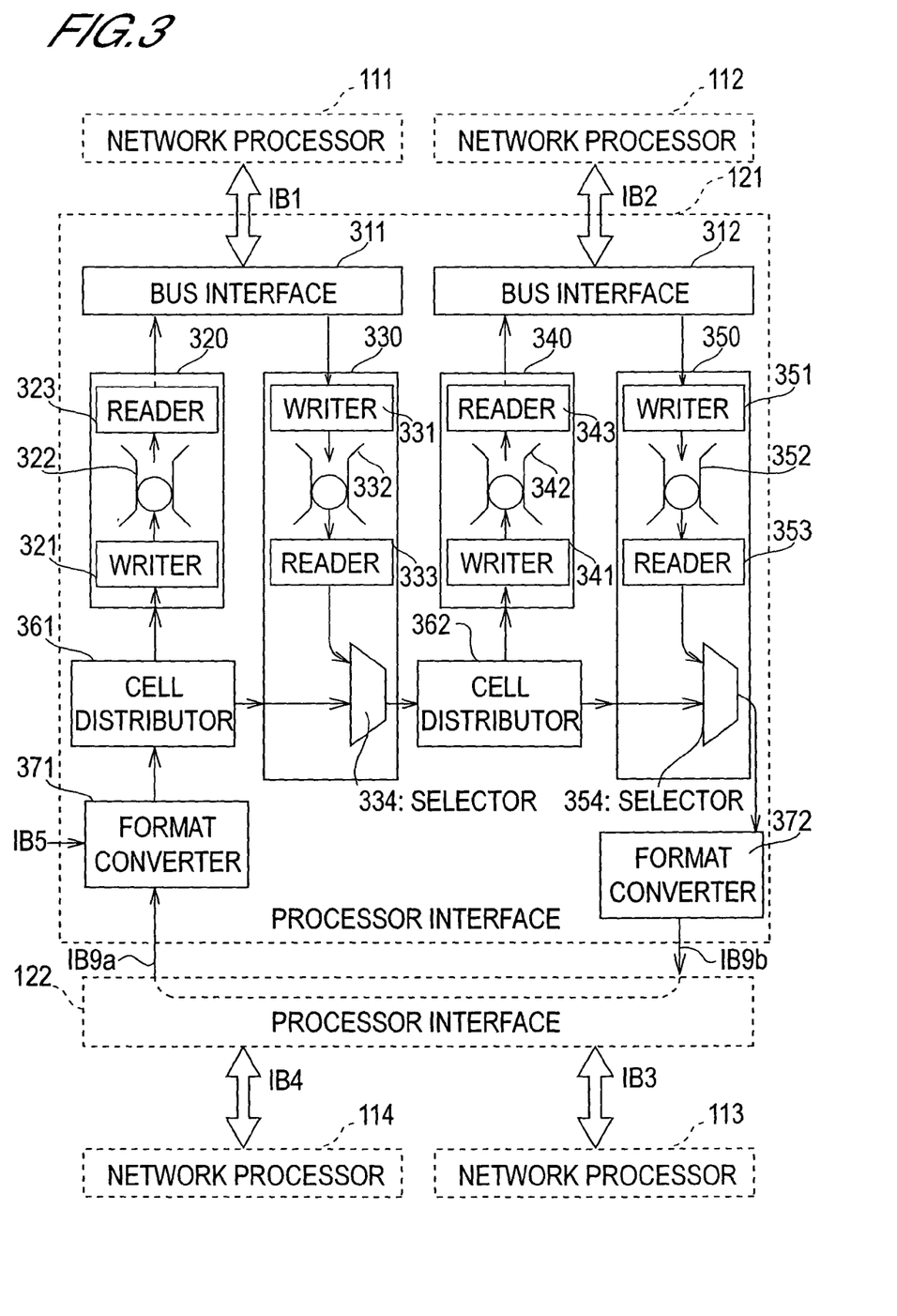
FIG. 3 is a block diagram illustrating the internal constitution of a processor interface according to the first embodiment.

FIG. 3 is a block diagram showing the internal constitution of the processor interface 121. As noted above, the internal constitution of the processor interface 122 is identical to the internal constitution of the processor interface 121.

As shown in FIG. 3, the processor interface 121 comprises bus interfaces 311, 312, buffer units 320, 330, 340, 350, cell distributors 361, 362, and format converters 371, 372.

The bus interface 311 is an interface for making a communication connection between the internal bus IB1 and the buffer units 320, 330. The bus interface 312 is an interface for making a communication connection between the internal bus IB2 and the buffer units 340, 350.

The buffer unit 320 temporarily stores cells received from the cell distributor 361. The buffer unit 320 comprises a writer 321, a buffer 322, and a reader 323. The writer 321 stores cells received from the cell distributor 361 in the buffer 322. The reader 323 reads the cells stored in the buffer 322 appropriately and outputs the cells to the bus interface 311.

The buffer unit 330 temporarily stores cells received from the bus interface 311. The buffer unit 330 comprises a writer 331, a buffer 332, a reader 333, and a selector 334. The writer 331 stores cells received from the bus interface 311 in the buffer 332. The reader 333 reads the cells stored in the buffer 332 appropriately and outputs the cells to the selector 334. The selector 334 receives cells from the reader 333 and the cell distributor 361 and outputs the cells to the cell distributor 362 (described below).

The buffer unit 340 temporarily stores cells received from the cell distributor 362. The buffer unit 340 comprises a writer 341, a buffer 342, and a reader 343. The writer 341 stores cells received from the cell distributor 362 in the buffer 342. The reader 343 reads the cells stored in the buffer 342 appropriately and outputs the cells to the bus interface 312.

The buffer unit 350 temporarily stores cells received from the bus interface 312. The buffer unit 350 comprises a writer 351, a buffer 352, a reader 353, and a selector 354. The writer 351 stores cells received from the bus interface 312 in the buffer 352. The reader 353 reads the cells stored in the buffer 352 appropriately and outputs the cells to the selector 354. The selector 354 receives cells from the reader 353 and the cell distributor 362, and outputs the cells to the format converter 372 (described below).

The cell distributor 361 receives cells from the format converter 371. As will be described below, two types of cells, a user cell and a token cell, are used in this embodiment. The cell distributor 361 determines whether a received cell is a user cell or a token cell from the header information of the cell, and when the received cell is a user cell, also determines the destination thereof. The cell distributor 361 then transmits the cell to the writer 321 or selector 334 in accordance with the results of these determinations.

The cell distributor 362 receives cells from the selector 334. The cell distributor 362 determines whether the received cell is a user cell or token cell from the header information of the cell, and if the received cell is a user cell, determines the destination thereof. The cell distributor 362 then transmits the cell to the writer 341 or selector 354 in accordance with the results of these determinations.

The format converter 371 receives cells from the internal bus IB5 and IB9$a$. Here, the internal bus IB9$a$ is a part of the internal bus IB9 which performs cell transfer from the processor interface 122 to the processor interface 121. When necessary, the format converter 371 converts the format of the received cell. The converted cell is then transmitted to the cell distributor 361 or internal bus IB5.

The format converter 372 receives cells from the selector 354. When necessary, the format converter 372 converts the preliminary format of the received cell. The format converter 372 then transmits the cell to an internal bus IB9$b$. Here, the internal bus IB9$b$ is a part of the internal bus IB9 which performs cell transfer from the processor interface 121 to the processor interface 122. The internal bus IB9$b$ transfers cells to the processor interface 122. When necessary, the processor interface 122 converts the format of the cells received from the internal bus IB9$b$.

Note that if format conversion is not required, the format converters 371, 372 do not have to be provided.

Figure 4A:
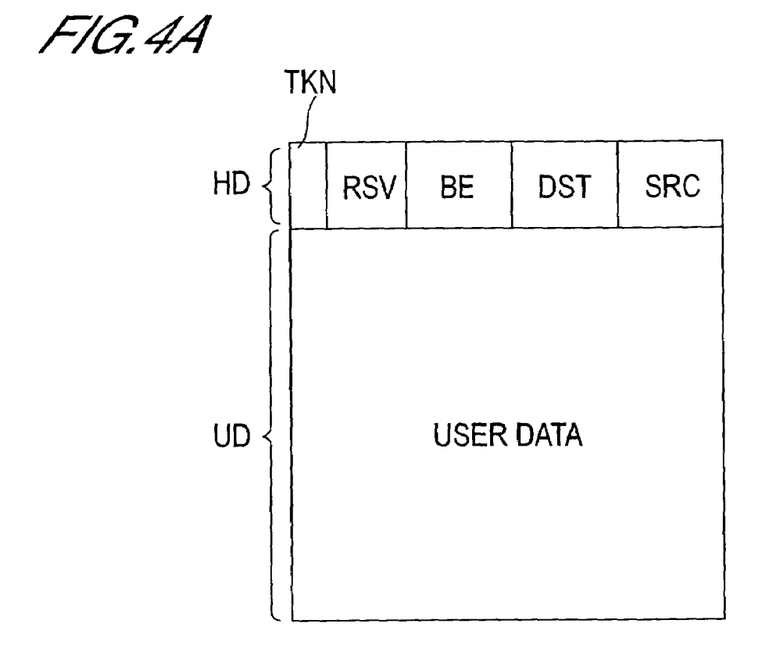
FIGS. 4A and 4B are schematic diagrams showing the format of a communication cell according to the first embodiment.
Figure 4B:
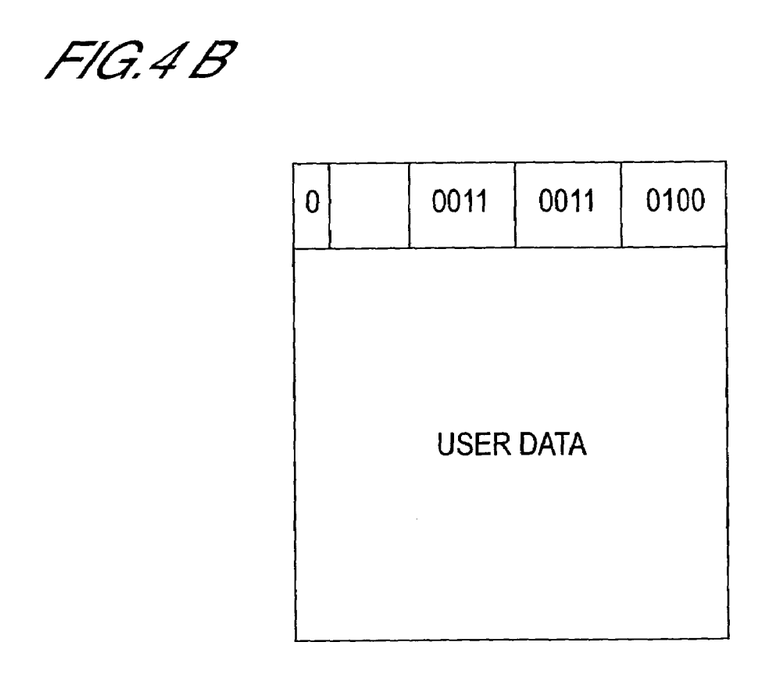

FIGS. 4A and 4B are schematic diagrams showing an example of the cell format used in the processor interface 121.

As shown in FIG. 4A, the cell comprises a header field HD and a user data field UD.

The header HD comprises a token cell field TKN, a reserve field RSV, a bit enable field BE, a destination field DST, and a loop inhibition field SRC.

The token cell field TKN stores the token cell/user cell classification. For example, "1" is stored in the token cell field TKN of a token cell and "0" is stored in the token cell field TKN of a user cell (see FIG. 4B). The difference between a token cell and a user cell will be described below.

The reserve field RSV is a field enabling a user to store arbitrary data.

The bit enable field BE stores the data length of the user data field UD. In other words, the bit enable field BE stores data indicating the boundary between a region in which data are actually stored and a region in which data are not stored. For example, when "0011", that is "3" in the decimal system, is stored in the bit enable field BE (see FIG. 4B), only the first $2^3$ bytes, that is eight bytes, of the user data field UD are valid data, and data from the ninth byte onward are meaning less data.

The destination field DST stores the destination address of the cell. A single address or a plurality of addresses can be stored in the destination field DST. If the destination field DST is set at four bits, then all combinations of the network processors 111 to 114 may be displayed. For example, the destination field can be defined such that when the least significant bit is "1", the network processor 111 is included in the destination, when the second bit is "1", the network processor 112 is included in the destination, when the third bit is "1", the network processor 113 is included in the destination, and when the most significant bit is "1", the network processor 114 is included in the destination. When the destination field DST is "0001", for example, only the network processor 111 is included in the destination, when the destination field DST is "0010", only the network processor 112 is included in the destination, and when the destination field is "0011", the network processors 111, 112 are included in the destination (see FIG. 4B).

The loop inhibition field SRC stores the transmission source address of the cell. The transmission source address is defined in accordance with the destination field DST. For example, the address of the network processor 111 is defined as "0001", the address of the network processor 112 is defined as "0010", the address of the network processor 113 is defined as "0100" (see FIG. 4B), and the address of the network processor 114 is defined as "1000".

The user data field UD stores data to be processed by the network processors 111 to 114 and the like. The size of the user data field UD may be fixed or variable.

Next, an operation of the communication control device 100 according to this embodiment will be described.

As described above, the communication control device 100 of this embodiment performs communications of data to be processed and communications of control information for parallel processing, and so on, with using the internal buses IB1 to IB9. Hence in this embodiment, an internal communication path having a ring-type topology is constituted by the cell distributors, format converters, and selectors inside the processor interfaces 121, 122. On a topology-type internal communication path, a collision occurs when control information cells is generated by different network processors and these cells become mixed. And this collision causes a signal breakdown. Hence in order to perform normal communication, a signal information cell generated by one of the network processors must not be inputted onto the internal communication path when a signal information cell generated by another network processor is being transported on the internal communication path. In order to achieve this, in the communication control device 100 of this embodiment, a token cell is used to set transmission rights in the selectors (see reference numerals 334, 354 in FIG. 3).

The token cell is generated at the time of power source start-up, for example, and outputted onto the internal communication path. This embodiment will be described using as an example in which a token cell is generated by the selector 334. Note, however, that the token cell may be generated anywhere. The token cell may also be generated in the selector 354, the cell distributors 361, 362, or the format converters 371, 372.

Only one token cell exists on the internal communication path. This token cell circulates through the internal communication path. The token cell is generated in the selector 334, transferred to the cell distributor 362, selector 354, and format converter 372, and then transmitted to the processor interface 122. The token cell then passes through a cell distributor, selector, and format converter within the processor interface 122 and is transferred to the format converter 371. Having been received by the format converter 371, the token cell is transferred to the cell distributor 361 and then transferred to the selector 334.

The network processors 111 to 114 generate user cells according to necessity. A cell in which communication data are stored and a cell in which control data are stored are examples of a user cell. Of a sequence of processes relating to communication data, the first half of the processes may be executed by the network processor 111 and the second half by the network processor 112, for example. In such a case, data to be processed and control data are transmitted from the network processor 111 via the processor interface 121 to the network processor 112.

User cells generated by the network processor 111 are transmitted on the corresponding internal bus IB1 to the bus interface 311 inside the processor interface 121. The writer 331 writes the user cells into the buffer 332. As will be described below, the user cells stored in the buffer 332 are not read until the selector 334 sends a read command to the reader 333.

Likewise, user cells generated in the network processor 112 are stored in the buffer 352. In addition, user cells generated in the network processors 113, 114 are stored in buffers (not shown) inside the processor interface 122.

The selector 334 receives a cell from the cell distributor 361. The selector checks the classification (token cell or user cell) of the received cell. If the received cell is a user cell, the cell is transmitted to the cell distributor 362 without performing other processing. If the received cell is the token cell, the selector 334 obtains transmission rights. Once transmission rights have been obtained, the selector 334 transmits a user cell read command to the reader 333. If user cells are stored in the buffer 332, the reader 333 successively reads the user cells stored in the buffer 332 in accordance with the command. The selector 334 then successively transfers the user cells read by the reader 333 to the cell distributor 362. When all of the user cells stored in the buffer 332 have been transferred to the cell distributor 362, the selector 334 transmits the token cell to the cell distributor 362. If no user cells are stored in the buffer 332, the token cell is transferred to the cell distributor 362 without performing user cell reading. Once the token cell has been outputted from the selector 334, the selector 334 loses transmission rights.

The cell distributor 362 checks the classification of the cell received from the selector 334. If the received cell is the token cell, the received cell is transferred to the selector 354 without performing other processing. If the received cell is a user cell, the cell distributor 362 reads the destination address from the destination field DST of the user cell. If the network processor 112 is not included in the destination addresses, the cell distributor 362 does not copy the user cell. If the network processor 112 is included in the destination addresses, the cell distributor 362 transmits a copy of the user cell to the writer 341. The writer 341 stores the received user cell in the buffer 342. The user cell stored in the buffer 342 is read by the reader 343 at a later stage and then transmitted to the network processor 112 via the bus interface 312 and internal bus IB2.

Next, the cell distributor 362 reads the transmission source address from the loop inhibition field SRC of the cell received from the selector 334. If the transmission source address is the address of the network processor 112, this means that the cell has traveled a complete circuit of the internal communication path. In this case, the cell distributor 362 disposes of the cell. If the transmission source address is not the address of the network processor 112, the cell distributor 362 transfers the cell to the selector 354.

The selector 354 operates in an identical manner to the selector 334. When the received cell is a user cell, the selector 354 transfers the cell to the format converter 372. If the received cell is the token cell, or in other words if the selector 354 obtains transmission rights, the selector 354 reads the user cells stored in the buffer 352. The read user cells are transmitted to the format converter 372. When reading is complete, the selector 354 transmits the token cell to the format converter 372.

As described above, the format converter 372 converts the format of the received cells when necessary, and then transfers the cells to the processor interface 122.

The format converter 371 receives cells from the internal buses IB5, IB9a, and when necessary converts the format of the received cells. Cells received from the internal bus IB9a are transferred to the cell distributor 361 or internal bus IB5. The format converter 371 transfers cells inputted from the internal bus IB5 to the cell distributor 361 only when the token cell has been received thereby (in other words, when transmission rights have been obtained). If transmission rights are not held, the format converter 371 stores the cells received from the internal bus IB5 in an internal buffer not shown in the drawing.

The cell distributor 361 operates in an identical manner to the cell distributor 362. When the network processor 111 is included in the destination of the received user cell, the cell distributor 361 transmits a copy of the user cell to the writer 321. The writer 321 stores the received user cell in the buffer 322. The user cells stored in the buffer 322 are read by the reader 323 at a later stage and then transmitted to the network processor 111 via the bus interface 311 and internal bus IB1. When the transmission source of the received cell is the network processor 111, the cell distributor 361 disposes of the cell. User cells which are not disposed of and the token cell are transferred to the selector 334.

The processor interface 122 operates in an identical manner to the processor interface 121 and hence description thereof has been omitted.

Figure 5:
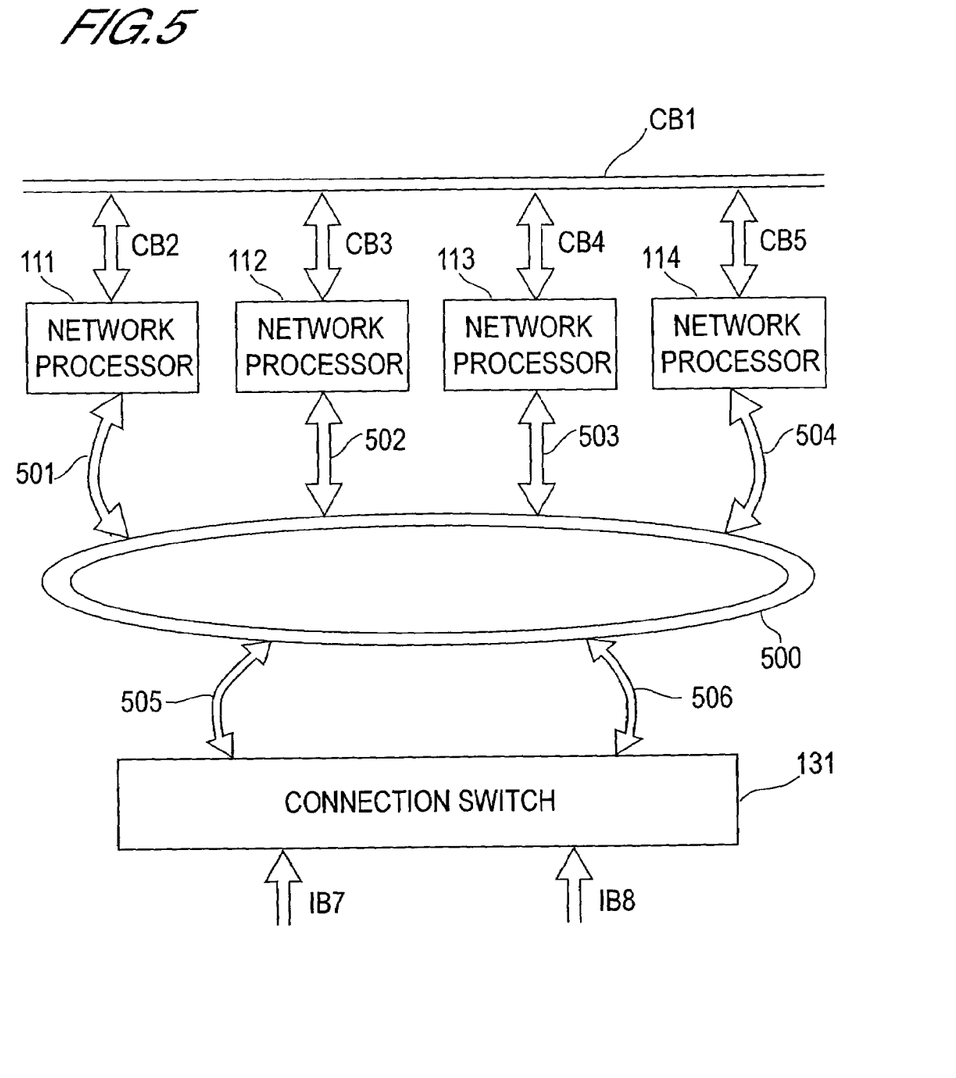
FIG. 5 is a schematic diagram showing an internal communication path according to the first embodiment.

FIG. 5 is a diagram showing in outline the internal communication path of the communication control device 100.

As shown in FIG. 5, the network processors 111 to 114 are connected to a ring-type internal communication path 500 via internal communication paths 501 to 504 (corresponding to the internal buses IB1 to IB4). Here, the communication path 501 may be considered schematically as a communication path which connects a processor unit 210 and a coprocessor unit 220 (see FIG. 2) to the ring-type internal communication path 500 (in actual fact, the processor unit 210 communicates with the processor interface 121 via the coprocessor unit 220). Hence each of processor units in the network processors 111 to 114 are capable of communicating not only with other processor units, but also with coprocessor units of other network processors. Similarly, the coprocessor units in the network processors 111 to 114 are capable of communicating not only with other coprocessor units, but also with the processor units of other network processors. Note, however, that there is a case where the processor units does not need to be provided with a communication function.

Further, in the communication control device 100 of this embodiment, the connection switch 131 and network processors 111 to 114 are connected via the ring-type internal communication path 500. Note, however, that the connection switch 131 and network processors 111 to 114 may be connected by a separate communication path (not shown). If a separate communication path is used, it is possible to use a cell format different from the cell format of the ring-type internal communication path 500 (see FIGS. 4A, 4B). For example, a cell format employed in an external network connected to the communication paths P1, P2 can become to be used.

As described above, in this embodiment the control buses CB1 to CB5 are mainly used in the initialization of the communication control device 100. However, the present invention may be applied to a communication control device in which the control buses CB1 to CB5 are used for controlling communication other than initialization. The present invention may also be applied to a communication control device not provided with the control buses CB1 to CB5.

This embodiment was described employing as a case in which two processor interfaces 121, 122 and four network processors 111 to 114 are used. However, the present invention does not limit the number of processor interfaces and network processors.

The communication control device 100 of this embodiment uses a token cell, and thus signal breakdowns on the internal communication path can be prevented. In other words, the communication control device 100 uses a token cell to manage transmission rights, and thus the internal communication path may be set in a plurality of processor interfaces. As a result, communication speed among network processors in the communication control device 100 is high, and accordingly processing speed in the communication control device is also high. Further, by providing the internal communication path, the number of communication ports in each network processor can be reduced.

Second Embodiment

A second embodiment of the present invention will now be described.

The overall constitution of a communication control device according to this embodiment is identical to the overall constitution of the communication control device 100 according to the first embodiment (see FIG. 1). The communication control device according to this embodiment differs from that of the first embodiment in the internal constitution of the processor interfaces.

Figure 6:
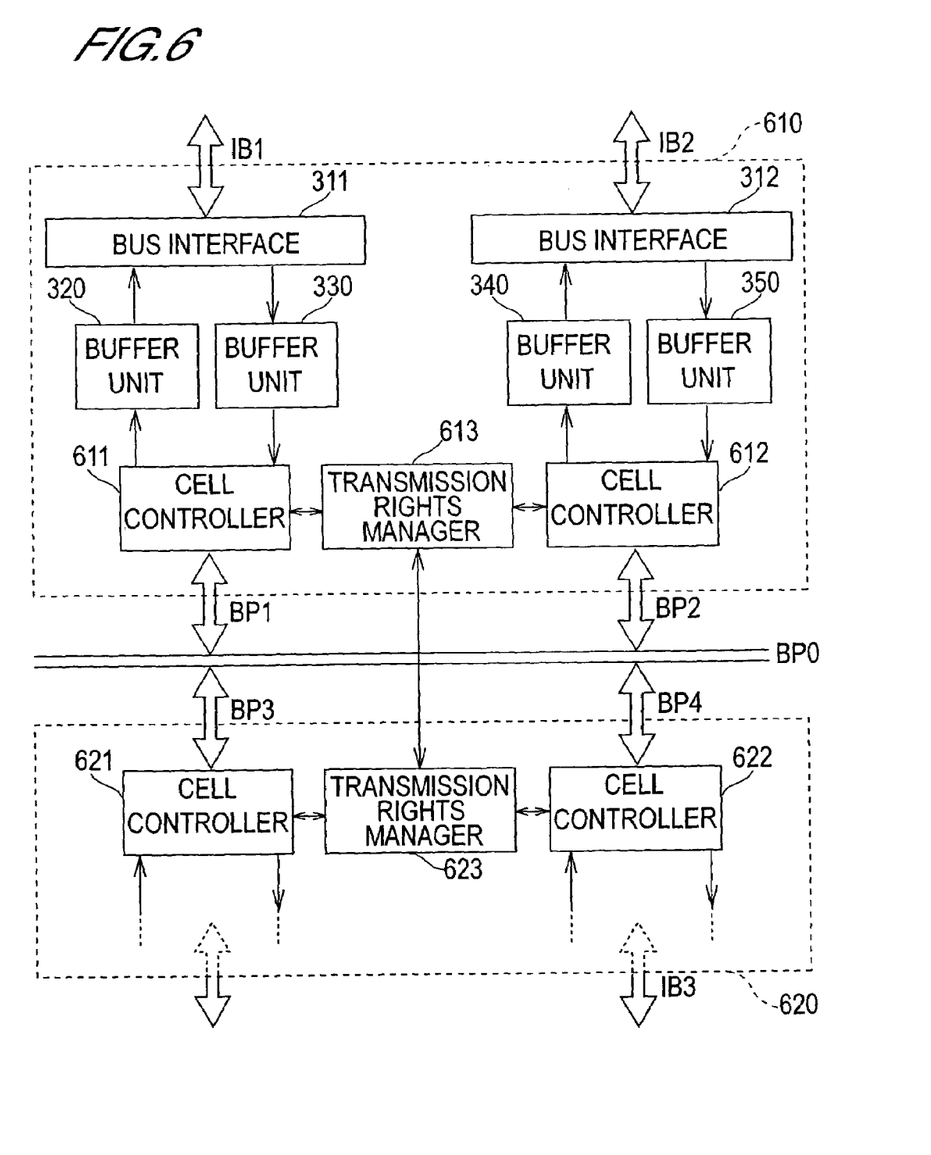
FIG. 6 is a block diagram illustrating the internal constitution of a processor interface according to a second embodiment.

FIG. 6 is a view illustrating the internal constitution of processor interfaces 610, 620 according to this embodiment. In FIG. 6, constitutional elements having identical reference numerals to FIG. 3 have the same constitution as the corresponding constitutional elements in FIG. 3.

As shown in FIG. 6, the processor interface 610 comprises cell controllers 611, 612 and a transmission rights manager 613. Similarly, the processor interface 620 comprises cell controllers 621, 622 and a transmission rights manager 623. In this embodiment, a bus-type internal communication path is set in the processor interfaces 610, 620. The bus-type internal communication path is constituted by buses BP0 to BP4. These buses BP0 to BP4 correspond to the internal bus IB9 in FIG. 1.

The cell controller 611 comprises the functions of the cell distributor and selector of the first embodiment. The cell controller 611 receives a user cell from the bus BP1 and checks the destination of the user cell. If the network processor 111 is included in the destination of the cell, the cell controller 611 transmits the received cell to the buffer unit 320. If the cell controller 611 has transmission rights, the cell controller 611 reads cells from the buffer unit 330 and outputs the cells to the bus BP1. The cell controllers 612, 621, 622 comprises the same functions as that of the cell controller 611.

The transmission rights managers 613, 623 grant transmission rights to the cell controllers 611, 612, 621, 622. Similarly to the first embodiment, transmission rights are never granted simultaneously to two or more cell controllers. When the transmission rights manager 613 receives a request for transmission rights from the cell controllers 611, 612, the other cell controllers lose transmission rights and then transmission rights are granted. In order to achieve this, the transmission rights manager 613 receives information relating to the presence or absence of transmission rights in the cell controllers 621, 622 from the transmission rights manager 623. Likewise, when the transmission rights manager 623 receives a request for transmission rights from the cell controllers 621, 622, the other cell controllers lose transmission rights and then transmission rights are granted. The transmission rights manager 623 receives information relating to the presence or absence of transmission rights in the cell controllers 611, 612 from the transmission rights manager 613. If requests are received simultaneously from a plurality of cell controllers, the transmission rights managers 613, 623 grant transmission rights to one of the cell controllers on a preferential basis in accordance with predetermined rules.

In this embodiment, a token cell is not used in the determination of transmission rights and only user cells are transmitted along the internal communication paths BP0 to BP4. Hence there is no need to provide the cells used in this embodiment with the token cell field TKN (see FIG. 4A).

In this embodiment, a bus-type internal communication path is used instead of a ring-type. Accordingly, user cells do not circulate around the internal communication path but are transmitted in series from the transmission source cell controller to the other cell controllers. Hence there is no need to provide the cells used in this embodiment with the loop inhibition field SRC (see FIG. 4A).

In the first and second embodiments, the processor interface may be constituted by either hardware or software.

What is claimed is:

1. A communication control device comprising:
a plurality of processors which perform predetermined parallel processing cooperatively;
a plurality of processor interfaces having one or more cell distributors and one or more selectors, in which each of said processors is connected to one of said cell distributors and one of said selectors;
an internal communication path which connects said cell distributors, said selectors, said plurality of processors, a first external communication path, and a second external communication path; and
a plurality of control buses which connect said processors to each other:
wherein said cell distributors receive communication cells from said internal communication path and transfer the received communication cells to the corresponding processor when the destination of the received communication cells are the corresponding processor;
wherein said cell distributors are coupled to receive communication cells from said internal communication path and output said communication cells onto said internal communication path when the destination of said received communication cells is not to the corresponding processor;
wherein said selectors receive communication cells from said corresponding processor and output said communication cells onto said internal communication path when possessing a transmission rights;
wherein said transmission rights are received and possessed by one selector at a time and said selectors abandon said transmission rights by outputting said transmission rights when said selectors end the outputting of the communication cells received from the corresponding processor;

wherein said control buses have a lower communication speed than that of said internal communication path; and wherein the communication control device processes said communication cells received from the first external communication path and transmits the communication cells to the second external communication path.

2. The communication control device according to claim 1, wherein said internal communication path connects said cell distributors and said selectors in a ring.

3. The communication control device according to claim 2, comprising a token cell generator for generating a token cell used to grant said transmission rights to one of said selectors, and outputting said token cell onto said internal communication path.

4. The communication control device according to claim 3, wherein said token cell generator is provided in said selector.

5. The communication control device according to claim 3, wherein said token cell generator is provided in said cell distributor.

6. The communication control device according to claim 3, wherein said selector outputs a communication cell received from a connected processor onto said internal communication path when said token cell is possessed thereby.

7. The communication control device according to claim 3, wherein said selector outputs said token cell onto said internal communication path after outputting all of the communication cells received from a connected processor.

8. The communication control device according to claim 1, wherein said internal communication path comprises a common bus connected to said cell distributors and said selectors.

9. The communication control device according to claim 8, comprising a transmission rights manager for granting said transmission rights to one of said selectors.

10. The communication control device according to claim 9, wherein, when a request for transmission rights is received from one of said selectors, said transmission rights manager grants transmission rights to said selector after another selector has lost transmission rights.

11. The communication control device according to claim 9, wherein said transmission rights manager is provided in each of said processor interfaces.

12. The communication control device according to claim 11, wherein, when a request for transmission rights is received from one of said selectors, said transmission rights manager grants said transmission right to the selector after receiving information indicating the assignment or loss of said transmission rights from another transmission rights manager.

13. The communication control device according to claim 1, wherein said processor interface comprises a buffer unit for temporarily storing communication cells transferred to a connected processor from said cell distributor.

14. The communication control device according to claim 13, wherein said buffer unit comprises:
a buffer for temporarily storing communication cells;
a cell writer for writing communication cells received from said cell distributor to said buffer; and
a cell reader for reading the communication cells stored in said buffer and transmitting the communication cells to said processor.

15. The communication control device according to claim 1, wherein said processor interface comprises a buffer unit for temporarily storing communication cells transmitted from said processor to said selector.

16. The communication control device according to claim 15, wherein said buffer unit comprises:
a buffer for temporarily storing communication cells;
a cell writer for writing communication cells received from said processor to said buffer; and
a cell reader for reading the communication cells stored in said buffer and transmitting the communication cells to said cell distributor.

17. The communication control device according to claim 1, wherein said processor interface comprises a format converter for converting the format of communication cells received from another of said processor interfaces via said internal communication path.

18. The communication control device according to claim 1, wherein said processor interface comprises a format converter for converting the format of communication cells to be transmitted to another of said processor interfaces via said internal communication path.

19. The communication control device according to claim 1, comprising a format converter for converting the format of communication cells received onto said internal communication path from said external communication pathways and the format of communication cells to be transmitted to said externals from said internal communication path.

20. A communication control device comprising:
at least a first and a second processor which perform predetermined parallel processing cooperatively;
at least a first cell distributor connected to at least said first processor and a second cell distributor connected to at least said second processor;
at least a first selector connected to at least said first cell distributor and said first processor and a second selector connected to at least said second cell distributor and second processor;
at least a first external communication path and a second external communication path;
an internal communication path which connects at least said first and second cell distributors, said first and second selectors, said first and second processors, and said first and second external communication paths; and
a plurality of control buses which connect at least said first and second processors to each other:
wherein said first cell distributor receives communication cells via said internal communication path and transfers said received communication cells to said first processor when the destination of said received cell is said first processor;
wherein said second cell distributor receives communication cells via said internal communication path and transfers said received communication cells to said second processor when the destination of said received cell is said second processor;
wherein said first cell distributor receives communication cells via said internal communication path and transfers said received communication cells to said first selector when the destination of said received cell is not said first processor;
wherein said second cell distributor receives communication cells via said internal communication path and transfers said received communication cells to said second selector when the destination of said received cell is not said second processor;

wherein said first selector receives said communication cells from said first processor and outputs said communication cells onto said internal communication path when possessing a transmission rights;

wherein said second selector receives said communication cells from said second processor and outputs said communication cells onto said internal communication path when possessing said transmission rights;

wherein said first selector possesses said transmission rights when said first selector receives a token cell and loses said transmission rights when said first selector outputs said token cell after said communication cells have been output;

wherein said second selector possesses said transmission rights when said second selector receives a token cell and loses said transmission rights when said second selector outputs said token cell after said communication cells have been output;

wherein said token cell is possessed by one selector at a time;

wherein said control buses have a lower communication speed than that of said internal communication path; and wherein said communication control device processes said communication cells received from said first external communication path and transmits said communication cells to said second external communication path.

* * * * *

UNITED STATES PATENT AND TRADEMARK OFFICE
CERTIFICATE OF CORRECTION

PATENT NO.       : 7,593,421 B2                                   Page 1 of 1
APPLICATION NO. : 10/630832
DATED            : September 22, 2009
INVENTOR(S)      : Hashimoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1142 days.

Signed and Sealed this

Twenty-first Day of September, 2010

David J. Kappos
*Director of the United States Patent and Trademark Office*